United States Patent Office 3,539,407

Patented Nov. 10, 1970

3,539,407
METALLIZED GLASS MASTER PLATES FOR PHOTOPRINTING

John J. Frantzen, St. Paul, Minn., assignor to Buckbee-Mears Company, St. Paul, Minn., a corporation of Minnesota No Drawing. Filed July 28, 1967, Ser. No. 656,698
Int. Cl. C23f *17/02;* B32b *31/24*
U.S. Cl. 156—3 5 Claims

ABSTRACT OF THE DISCLOSURE

The master plate for repetitively photoprinting a multitude of circuit patterns comprises a sheet of glass coated with a very thin layer of metal lines which define the desired circuit pattern. The master plate is formed by initially bonding or laminating a relatively thick sheet of metal, such as copper, to the surface of a supporting glass plate and then etching the desired pattern out of the copper sheet.

BACKGROUND OF THE INVENTION

Field of the invention

This invention pertains to photoprinting plates and methods for making same. It is particularly directly toward making photoprinting plates which are to be used over an over again to print a multitude of circuits and, more particularly, where the circuit patterns are of a precision nature so that in the printing step close tolerances are required.

Description of the prior art

In the past, most glass masters for photographic reproduction were made out of emulsion coated glass. The principal drawbacks of these are that the emulsion coating is relatively soft so is scratched easily and is susceptible to the environmental conditions in which it is used. To overcome these disadvantages, harder coating substances, such as metal, have been proposed. In making metallized glass masters, the practice has been to use relatively thick sheets of metal, such as copper, to assure a secure bond of the metal to the glass. But it was found that due to inherent characteristics of the etching process, precision patterns could not be produced to the needed tolerances. Attempts to alleviate this by plating or otherwise depositing very thin layers of copper on the glass surface did not produce satisfactory results because the metal did not bond securely enough and would be quickly stripped off the glass even after little use.

SUMMARY

A relatively thick sheet of copper webbing is bonded onto the surface of a supporting plate glass using a suitable transparent adhesive in a heated press. The copper sheet is then subjected to a controlled etchant bath to reduce its thickness considerably. The exposed surface of the copper is then covered with a light sensitive material and the desired circuit pattern is printed on the sensitized coating, developed out and then the circuit pattern is etched out of the copper sheet. Etching the pattern out of the thinned down layer of copper produces the precision circuit at the tolerances which are acceptable. Metallized master plates formed in this manner are less susceptible to damage from handling and environmental conditions, and are more stable. As a further feature, it has been found that some of the circuit patterns can be quickly checked for accuracy by using electrical conductivity tests which cannot be done with emulsion coated glass plates.

DESCRIPTION OF PREFERRED EMBODIMENTS

A glass plate which may be in the order of 1/4 to 1/8 inch thick, for example, is thoroughly cleaned in any well-known manner. Present day ordinary glass plates are smooth and clear enough for the intended purpose although, if required, certain preferred types of glass can be used and, if necessary, the glass can be smoothened and flattened by processing. All of this is a matter of choice and depends on the degree of transparency and uniformity that the user requires. A clear adhesive, such as a viscous epoxy made by Minnesota Mining and Manufacturing identified as MMM 1622BA is poured on the horizontally disposed glass plate near the general vicinity of its center to form a small puddle. It has been found that the adhesive can also be applied by dripping it from the container onto the glass spirally outward from the general center of the glass plate. The manner of applying the adhesive is a matter of choice and experience. A sheet of copper in the order of .0015" in thickness is then laid over the adhesive-coated glass and pressed firmly and uniformly using a suitable fixture or a combination of different fixtures on the glass which will provide the necessary pressures and temperatures. Typically, it has been found that a glass plate can be placed over the copper sheet and cushions placed under the bottom glass and over the top glass as a satisfactory means for applying pressure to bond the copper to the lower glass plate while protecting the glass against breakage. With this combination supported on a suitable stand, a press bears down at approximately 200 pounds per square inch and the temperature is raised to approximately 300° F. and held for one to 1½ hours. This causes the adhesive or an epoxy to spread evenly over the glass and to set up to securely bond the copper layer to the glass.

After the bonded laminate has been allowed to cool down, it is then placed in an etching chamber where liquid etchant attacks the top surface of the copper in a uniform manner to reduce the thickness of the copper layer. Typically, this may be done by using what is known as a paddle-cup sprayer which comprises a continuously rotating paddle wheel having cups on its ends which pick up the liquid etchant and drops it or throws it uniformly over the copper surface. The etching time is controlled carefully so that when the copper has been reduced down to approximately .00025 inch thickness, the etching is terminated and the laminate is washed cleaned and dried.

After the copper has been reduced to the desired thickness, it is coated, using well known techniques, with a suitable light sensitive enamel or resist and using other well known photoprinting techniques, the desired circuit pattern is photoprinted on the enamel surface. After the printing, the normal course of developing follows. Where the copper is exposed and not covered by the resist or enamel, it is etched away and what remains is the desired circuit pattern defined by the copper remaining on the glass. It should be noted here that when etching through copper as thin as .00025 inch, undercutting is of no particular concern, and the usual tapered effect which occurs when etching through relatively thick copper sheets is minimized. Therefore, the fine line definition which is required to be reproduced by the glass master in its normal use can be achieved with tolerances and the degree of precision required which heretofore has not been possible except with emulsion-coated glass masters. Glass masters produced according to the foregoing method have been used over and over again in contact photoprinting without replacement as compared to the much more regular replacement of emulsion coated glass masters because they are easily scratched or otherwise damaged by handling and during normal use contact photoprinting.

I claim:

1. A process for making metallized glass master photo-printing plates, comprising the steps of:

(a) cleaning a surface of a flat plate of clear glass;

(b) bonding a relatively thick layer of metal webbing to the cleaned glass surface;

(c) reducing the thickness of the bonded layer of metal webbing by etching it away uniformly over its entire exposed surface; and (d) etching a circuit pattern out of the reduced-thickness layer of bonded metal.

2. The process as described in claim 1 wherein the thick layer of metal is bonded to the glass with a clear adhesive.

3. The process as described in claim 2 wherein the metal layer is bonded to the glass by spreading a clear viscous adhesive uniformly over the cleaned glass surface and then pressing the metal layer onto the adhesive coated glass.

4. The process as in claim 3 wherein in step C the bonded layer of metal is etched for a period of time sufficient to reduce its thickness to a range of 20% of its original thickness.

5. The invention as in claim 3 wherein the thickness of the bonded layer of metal is initially in the range of .0015 inch and is reduced by etching in step C to the range of .00025 inch.

References Cited

UNITED STATES PATENTS

| | | | |
|---|---|---|---|
| 2,036,021 | 3/1936 | Cheney | 156—3 |
| 2,673,142 | 3/1954 | Glynn | 156—3 |

J. H. STEINBERG, Primary Examiner

U.S. Cl. X.R.

96—36.2